Sept. 19, 1944.   J. J. BLACK   2,358,488
PROP FOR SEMITRAILERS
Filed Aug. 18, 1943   2 Sheets-Sheet 1
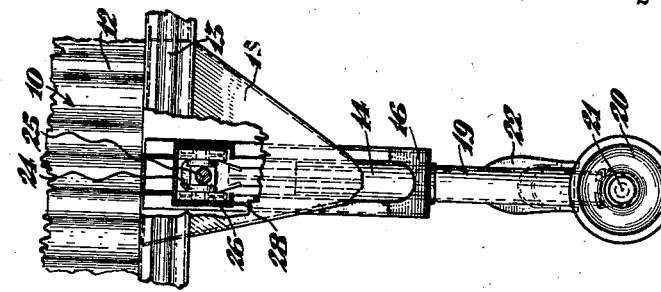
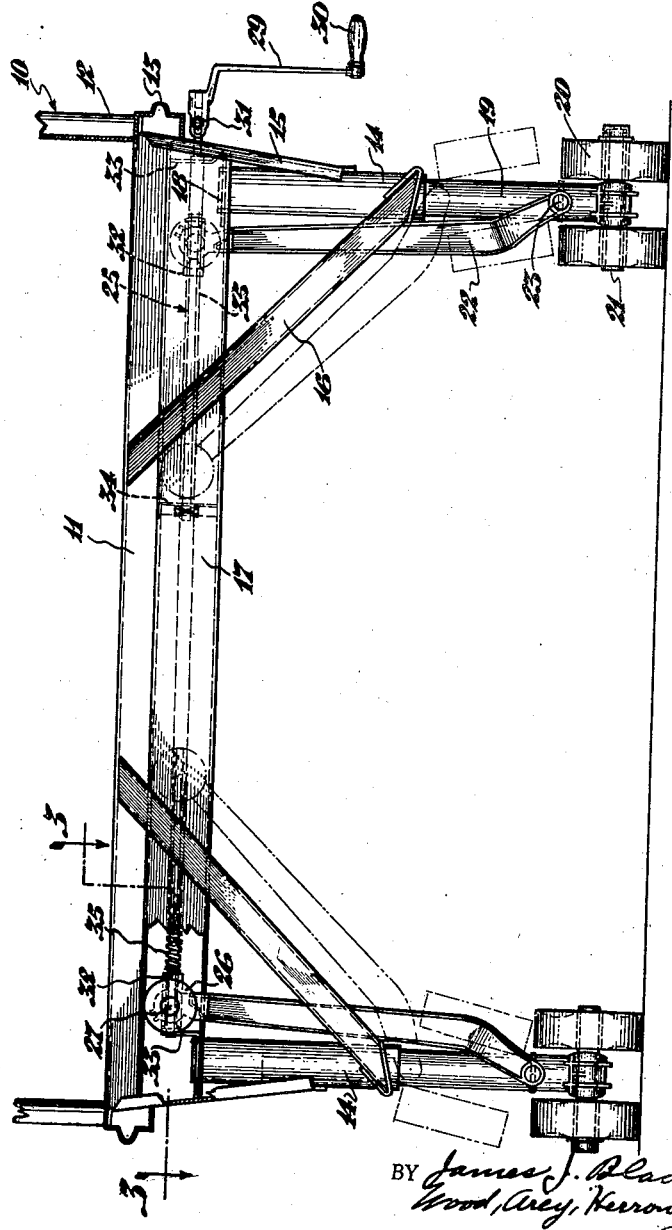
INVENTOR.
BY James J. Black
Wood, Arey, Herron & Evans
Attorneys.

Sept. 19, 1944.   J. J. BLACK   2,358,488
PROP FOR SEMITRAILERS
Filed Aug. 18, 1943   2 Sheets-Sheet 2
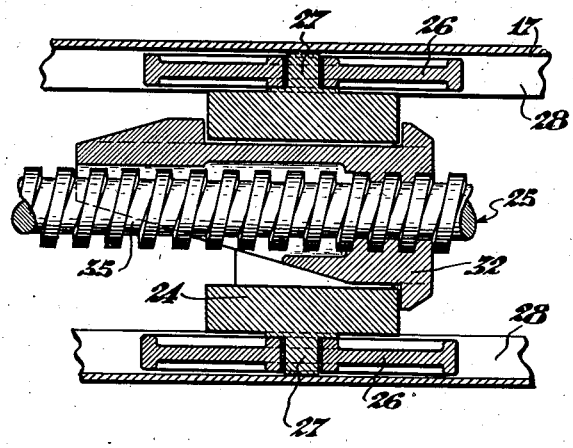
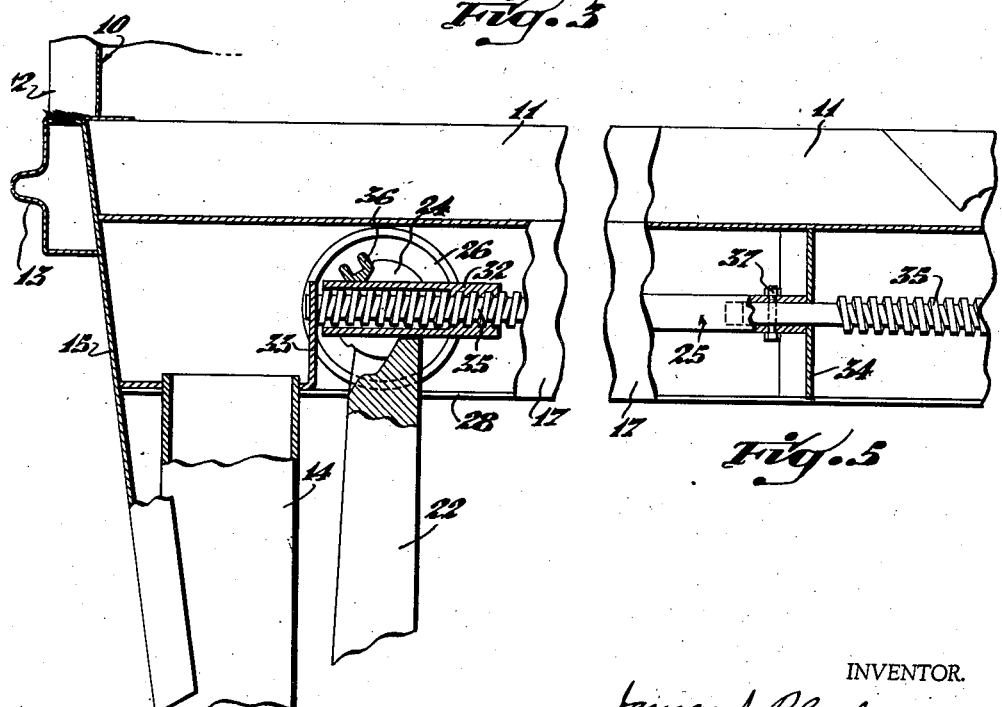

Patented Sept. 19, 1944

2,358,488

UNITED STATES PATENT OFFICE 2,358,488

PROP FOR SEMITRAILERS

James J. Black, Cincinnati, Ohio, assignor to The Trailer Company of America, Cincinnati, Ohio, a corporation of Ohio Application August 18, 1943, Serial No. 499,127

10 Claims. (Cl. 254—86)

This invention relates to a prop construction for supporting the front end of road vehicles, particularly a vehicle such as a semi-trailer which, after detachment from the tractor, is left positioned for loading and unloading. Props of various types have long been an essential feature of vehicles of the semi-trailer type.

In the past, generally speaking, there have been two recognized types of construction. In the first of these the props are retracted by folding them rearwardly toward the under side of the semi-trailer body. In this type of construction a quick and easy retraction can be accomplished, but it is open to the objection that the supports for the prop almost necessarily lack sufficient rigidity to support the body of the semi-trailer in the event that the fifth wheel mechanism, connecting the tractor and trailer, should accidentally become disengaged before the props are extended. As a result, when an accident of this sort occurs, the props and their supports completely collapse and the body of the vehicle and the load positioned therein are frequently damaged seriously.

Another conventional type of prop construction is one in which the posts which directly support the wheels of the props telescope vertically into larger and more strongly constructed posts secured to the trailer body. This type of construction can be made extremely strong, sufficiently so as to support the semi-trailer body and prevent damage to the body and the load in the case of accidental disengagement of the fifth wheel. However, this degree of strength can be obtained only by the provision of particularly heavy and rugged parts. These parts add to the weight and resultant cost of the prop and, in particular, greatly retard the ease of operation. Another objection to this type of construction is that a very substantial amount of physical effort is required to raise a loaded trailer even slightly when the props are extended. This raising is sometimes necessary to obtain a fifth wheel engagement when the trailer is positioned on irregular ground.

One of the objects of the present invention has been the provision of a prop construction which combines the best features of the prior art structures, in that it is quick and easy to operate but, at the same time, sufficiently strong to withstand the shock of a sudden lowering of the semi-trailer body while the props are in retracted position.

Another object of the invention has been the provision of a prop construction adapted to be utilized as a jack for both supporting the front end of the semi-trailer and adjusting its elevation, the construction being characterized by such an arrangement of elements that the prop moves at a comparatively rapid rate in relation to its actuating crank when the prop is near its upper position, and at a much less rapid rate in the proximity of its trailer supporting portion, thus providing greater power for manipulating the weight of the semi-trailer.

Another object has been the provision of a prop structure which can be serviced or repaired with great ease and facility.

Other and further objects and advantages will be apparent from the further and more detailed description of a preferred embodiment of the invention when considered in conjunction with the drawings, in which:

Figure 1 represents a front elevation of a structure of the preferred type of the invention in operative position on a semi-trailer body.

Figure 2 is a side elevation partially broken away to show the details of operation of the prop retraction mechanism.

Figure 3 is a sectional view along the line 3—3, Figure 1.

Figure 4 is an enlarged view of the upper left-hand corner of Figure 1, certain portions being broken away to illustrate more clearly the construction.

Figure 5 is a sectional view particularly illustrating the manner in which the sections of the screw rod are joined together and supported at the interior of the cross track.

In Figure 1 a semi-trailer body of conventional construction is indicated generally at 10. A lower cross rail of channel shape is indicated at 11. This may be one of a number of identical channels extending between the side rails of the body and secured thereto. The side walls of the body have been designated as 12 and the lower side rub rails, as 13.

In the construction of the props a pair of hollow vertical posts are disposed on the under side of the trailer body and are designated as 14. These posts may be of strong and rigid construction and are further braced by the triangular plate 15, which is welded to the side of the post at one end, and to the channel 11 and side rail 13 at the other. Additional bracing is provided by the diagonal strut 16, which may likewise be welded to the post 14 and channel 11. The operating mechanism for retracting the props is housed in the cross track 17, which may be of general channel shape. The cross track may be welded to the under side of the channel 11 and may extend completely across the under side of this channel. The upper ends of the posts 14 may be inserted through the under side of the cross track 17 and secured thereto by means of a plate 18, as illustrated in dotted lines in Figure 1.

A second pair of vertical posts 19 of slightly smaller diameter than the posts 14 are disposed beneath these latter posts and are adapted to telescope upwardly therein when the props are retracted. The posts 19 are of forked construction at their lower ends and support the pairs of wheels 20 journalled on the axles 21, one wheel being positioned on each side of each post to provide a better distribution of the weight of the load.

Retracting arms 22 are pivotally secured to the posts 19, as at 23. At the upper ends of these arms, forks 24 are formed and these forks are inserted in the cross track 17 at its under side. The screw rod 25 is disposed between the arms of the forks and extends through the cross track 17 from one side of the trailer body to the other. A channel shaped brace 36 may be extended across the arms of the forks and secured thereto. Rollers 26 are journalled on shaft projections 27 formed outwardly from the forks (see Figure 3). These rollers are adapted to ride on flanges 28 on the inner and under side of the cross track 17.

Nuts 32 are secured between the arms of the forks 28 in the manner best illustrated in Figure 3. These nuts are preferably of the particular mutilated configuration illustrated in Figure 3, to facilitate the assembly of the entire structure both initially and after it has been taken apart for servicing or repair.

The screw rod 25 is preferably in two sections joined centrally of the cross track by the bolt 37 (see Figure 5). It is operated from a crank 29, on which a crank handle 30 may be conveniently positioned. The crank is connected to the screw by a swivel connection as at 31 to permit the inward folding of the crank when the props are retracted and the semi-trailer is in operation. The screw rod 25 is supported in the cross track 17 by plates 33 positioned at the ends of the channel and by a similar plate 34 positioned centrally therein. The screw rod 25 may have screw threaded portions 35 at each end. The portion on the right (not shown) may have a right-hand screw thread and, on the left, a left-hand thread to permit retraction of both props by the single screw rod 25.

In the operation of the prop retracting mechanism, as the crank 29 turns the screw rod 25, the nuts 32 are actuated toward the center of the semi-trailer body. By reason of their engagement with them these nuts, in turn, actuate the forks 24 of the retracting arms 22 and the rollers 26. As the nuts and rollers move toward the center of the vehicle, the retracting arm 16 is inclined inwardly and the post 19 is telescoped upwardly into the post 14. In fully retracted position the arm 22 and the wheels 20 will appear as shown in dot-dash lines in Figure 1. A reversal of the direction of the crank will perform the converse function of extending the props.

It will be observed that when the props are in fully retracted position, the rigid vertical posts 14 are available to bear the brunt of a sudden lowering of the semi-trailer body caused by accidental disconnection of the fifth wheel, or otherwise. At the same time, the retracting and extending steps are particularly simple because both steps are accomplished by a lateral movement of the operative elements rather than a vertical one.

This novel arrangement of elements provides a combined prop and jack on the front end of a semi-trailer. It is to be noted that the arms, or links, occupy approximately a vertical position when the prop is in its lowermost position. This arrangement is desirable in that it places an endwise, rather than a distorting or bending trailer supporting thrust, upon the arms or links, and also because this arrangement provides a relatively rapid motion for the prop in the upper range of its travel remote from the ground, and a slow rate of motion in its travel adjacent to the ground—that is, a greater leverage when and where needed. Otherwise expressed, the arrangement disclosed provides both a prop and a compound jack; the elevating screws and nuts constituting one motion reducing mechanism, and the linkage, a second motion reducing mechanism, when the prop is in a lowered position.

The motion reducing action of the linkage increases as the prop is lowered and provides relatively fast action in the upper range where no resistances are involved, and slow, powerful motion when the prop is next to the ground.

One of the features of the construction is the facility with which the structure may be maintained and repaired. All of the various parts are readily accessible for greasing and other servicing. All of the operative parts are of strong and rigid construction and there should be little possibility of breakage. However, in the event that it is desired to disassemble the screw and nut mechanism, this can readily be done by first removing the plates 15. The screw rod 25 may then be disjointed and withdrawn in sections and the nuts 32 may also be removed from their position around the fork members 24 by simply turning them to a diagonal position. The particular configuration of the nuts as shown in Figure 3 is also of great utility in the initial assembly of the structure.

Having described my invention, I claim:

1. A prop construction for semi-trailers or the like comprising a pair of hollow posts secured to the semi-trailer at opposed sides thereof, wheel supporting posts telescoped within said hollow posts, retracting arms pivotally secured to said wheel supporting posts and means for actuating the upper ends of the retracting arms inwardly of the semi-trailer and thereby telescoping the wheel supporting posts upwardly into the hollow posts.

2. Prop construction for road vehicles comprising a cross track disposed laterally on the under side of the vehicle, a pair of hollow posts secured to the vehicle, one at each end of the cross track, wheel supporting posts inserted in said hollow posts, retracting arms pivotally secured to the wheel supporting posts and having their upper ends positioned contiguous to the cross track, and means for moving the upper ends of the retracting arms inwardly of the vehicle along the cross track and thereby telescoping the wheel supporting posts upwardly into the hollow posts.

3. Prop construction for semi-trailers or the like comprising a cross track disposed laterally across the semi-trailer, hollow posts depending from the semi-trailer at either end of the cross track, a wheel supporting post adapted to telescope upwardly in each of said hollow posts, a retracting arm pivotally secured to each of the wheel supporting posts and having its upper end disposed contiguous to the cross track, a screw rod supported adjacent to the cross track, nuts engaged by the screw rod and secured to the upper end of the retracting arms, whereby the revolution of the screw rod moves the upper ends of the retracting arms along the cross track and inwardly of the semi-trailer and telescopes the wheel supporting posts upwardly into the hollow posts.

4. Retractable prop construction for semi-trailers or the like comprising a pair of hollow posts secured to the under surface of the semi-trailer at opposed sides thereof, wheel supporting posts adapted to telescope upwardly into said hollow posts, a screw rod disposed between the hollow posts, retracting arms connected to the wheel supporting posts and interconnected with the screw rod, whereby operation of the screw rod inclines the retracting arms inwardly of the semi-trailer and thereby telescopes the wheel supporting posts upwardly into the hollow posts.

5. Retractable prop construction for semi-trailers or the like comprising a cross track spanning the sides of the semi-trailer on the under side thereof, hollow posts depending from the semi-trailer, one at each end of the cross track, supporting posts adapted to telescope upwardly into said hollow posts, retracting arms connected to the supporting posts and having their upper ends disposed above the cross track, and means positioned on the cross track for moving the upper ends of the retracting arms inwardly of the semi-trailer and thereby telescoping the supporting posts upwardly into the hollow posts.

6. A prop construction for supporting the front end of semi-trailers comprising a pair of hollow vertical posts positioned one adjacent each front corner of the vehicle, support posts telescopically fitted in said hollow posts, a screw rod disposed between the hollow posts and means interconnecting the support posts and screw rod for telescoping the support posts upwardly upon actuation of the screw rod, said means including retracting arms connected to the support posts and inwardly inclinable from manipulation of the screw rod.

7. A prop construction for semi-trailers or like vehicles comprising a cross track disposed transversely across the under side of the vehicle, hollow vertical support posts depending from said cross track at the ends thereof, support posts telescopically fitted in said hollow posts, retracting arms connected to said support posts and having their upper ends disposed adjacent the cross track, rollers journalled on the upper ends of the retracting arms for guiding the said upper ends along the channel, and means for actuating the rollers along the cross track inwardly of the ends thereof and thereby telescoping the support posts upwardly to a retracted position.

8. A prop construction for semi-trailers, comprising a prop element adapted to contact the ground, means for guiding said prop element up and down vertically, retracting arms pivotally secured to said prop element and means for translating the upper ends of said retracting arms in a horizontal plane in unison, the retracting arms approximating a vertical position when the prop is in its lowermost position.

9. A combined prop and jack for a semi-trailer, comprising an element adapted to be contacted with the ground to support the front end of a semi-trailer, means for guiding said element up and down in a vertical plane, arms pivoted to said element and extending upwardly therefrom substantially to the level of the trailer frame, means for translating the upper ends of said arms in unison in a horizontal plane to raise and lower the trailer supporting element, the arms occupying positions approximately vertical when the trailer supporting element is in its lowermost position.

10. A combined prop and jack for a semi-trailer, comprising elevating screws mounted in the frame of the trailer, means for rotating the said elevating screws in unison for raising and lowering the prop, a nut associated with each elevating screw adapted to be translated in a horizontal plane by the rotation of the elevating screws, a prop member adapted to contact the ground, means for guiding said prop member up and down the vertical plane, and links pivotally connecting said prop members and said nuts, whereby rotation of the elevating screws raises or lowers the prop member.

JAMES J. BLACK.